Oct. 4, 1966   M. S. TOUGAS ET AL   3,276,433
SQUEEZE CHUTE FOR ANIMALS
Filed Nov. 9, 1964   3 Sheets-Sheet 1
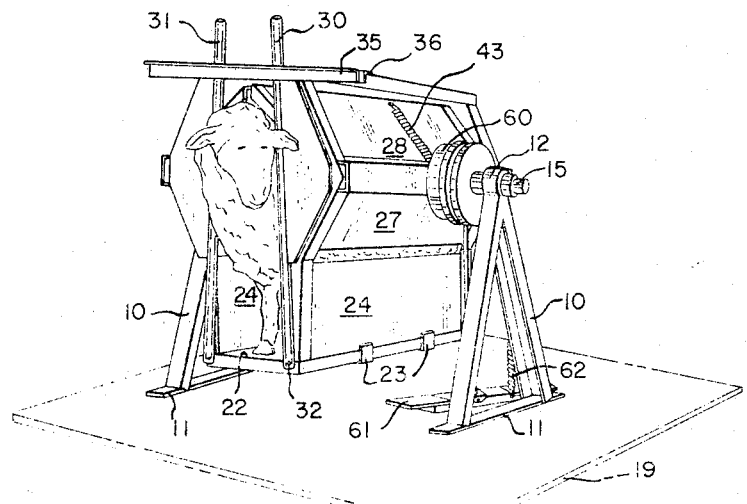
FIG. 1
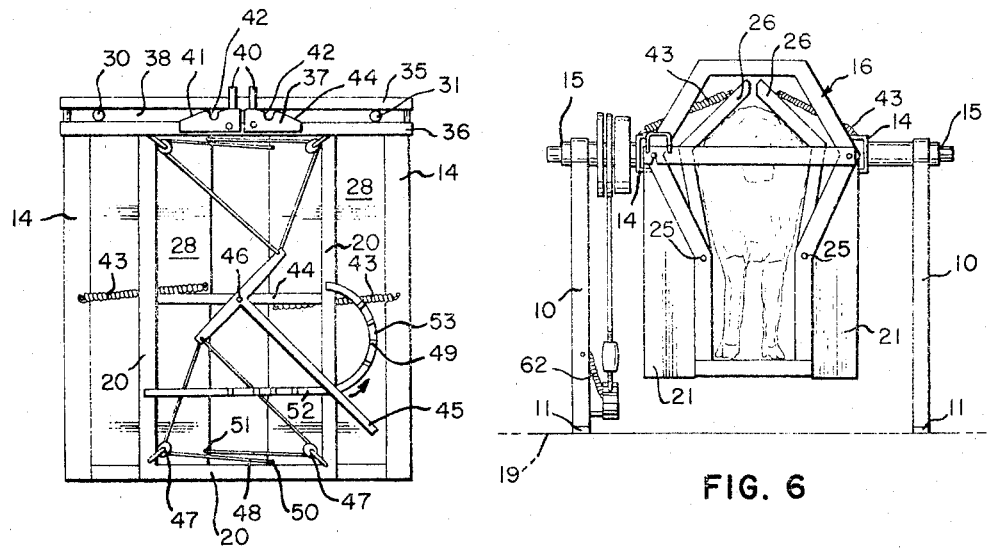
FIG. 2
FIG. 6
INVENTORS
MARCEL S. TOUGAS
JOHN J. DAVIEAU
BY Henry Gifford Hardy
ATTORNEY Oct. 4, 1966 M. S. TOUGAS ETAL 3,276,433
SQUEEZE CHUTE FOR ANIMALS
Filed Nov. 9, 1964 3 Sheets-Sheet 2

INVENTOR.
MARCEL S. TOUGAS
BY JOHN J. DAVIEAU

ATTORNEY

Oct. 4, 1966  M. S. TOUGAS ETAL  3,276,433
SQUEEZE CHUTE FOR ANIMALS

Filed Nov. 9, 1964  3 Sheets-Sheet 3

INVENTORS
MARCEL S. TOUGAS
BY JOHN J. DAVIEAU

ATTORNEY

United States Patent Office 3,276,433
Patented Oct. 4, 1966

3,276,433
SQUEEZE CHUTE FOR ANIMALS
Marcel S. Tougas, Sonoma, Calif. (499 Apple Tree Lane, Fairfield, Calif.), and John J. Davieau, 27665 Arnold Drive, Sonoma, Calif.
Filed Nov. 9, 1964, Ser. No. 409,809
7 Claims. (Cl. 119—103)

This invention relates in general to chutes for restraining the movement of animals. More specifically, this invention is directed to a means for restraining and immobilizing animals during care and treatment, e.g., branding, clipping, applying medication and the like, without injury to or frightening the anmal causing injury to itself in struggling. While the chute is applicable to most animals it is particularly adaptable to the care, inspection and treatment of sheep.

In the raising and keeping of animals it is often necessary to inspect, treat and care for them individually and closely on all parts of their bodies, not only for diagnostic and treatment purposes if they are ailing, but for keeping them well. Such personal attention is especially important with sheep. In addition to the common diseases, worms, and bruises and cuts, sheep, by their very nature and use, require constant inspection and care in a repetitive cycle. Medication is frequently necessary in the frog or clove of the hoof and in the heart of the hoof. Teeth and udders must be examined. The buttocks must be shaved before shearing time so that droppings will not cling to the wool.

In the treatment and care of larger animals branding chutes are often used, although snubbing and tying down are still common. Squeeze gate cages for wild animals generally operate on a screw principle and are heavy and cumbersome so that operation thereof is slow. Accordingly, for most domesticated smaller animals, e.g., sheep, goats, calves, pigs and the like, it becomes necessary to catch and throw the animal and then hold or tie it while treatment is being applied. These operations nearly always require the service of more than one man and are time-consuming. With sheep, it is said that two men working together will not be able to work much longer than an hour at a time, so much exertion is required. In addition, the positioning of the animal may require several movements and/or may be impossible to adequately attain with conventional equipment and methods, which also frequently in themselves result in broken ribs, and rough treatment resulting in loss of weight, and other direct damages to the animal.

An advantage of the invention is that small domesticated farm animals may be confined within the squeeze chute and easily treated or cared for without the necessity of physically catching, throwing and tying down or subjecting them to any physical handling.

Another advantage is that once the animal is confined within the chute it may be rotated to any position so that feet, legs, lower body, rump, face, teeth, neck, shoulders and other parts of the body may freely be examined without changing the restraints or rolling the animal, or physically holding it down at one or more points.

A further advantage is that the animal is held firmly yet gently so that there is no injury or rough treatment which results in loss of weight or a period of sickness or even physical injury.

A still further advantage is that the animal may be placed within the chute without frightening the animal or making it wild and hard to catch.

Accordingly an object of the invention is to provide an animal chute which presses against the sides and back of the animal, confining it from movement without struggle or injury while permitting access to its legs, feet, rump and head.

A further object is to provide an animal chute which humanely holds and secures the animal and permits a rotation of the animal in comfort to any desired position, i.e., on which its extremities are pointing upwardly.

Another object is to provide a pivotable chute which can be stopped and held at any pivot angle.

A further object is to provide a chute having side walls which can be made to squeeze in and around the sides and back of the animal, for humane and comfortable adjustment to and securing of varying sizes and shapes.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Referring to the drawings:

FIGURE 1 is a perspective view of the squeeze chute of the invention showing the chute and stanchion in the closed position and a sheep retained therein;

FIGURE 2 is a top plan view of the squeeze chute of the invention without pivots and pivot supports showing the cinch bar in the closed position;

FIGURE 6 is a rear end diagrammatical elevational view showing the chute in the closed position;

Figure 3:
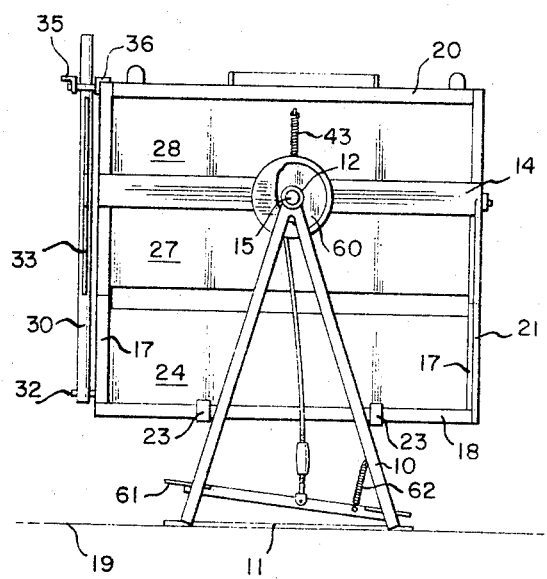
FIGURE 3 is a side elevation showing the chute in the normal upright position and the chute axle brake mechanism.

Referring now to the drawings in which like reference numerals indicate like parts in the several views and more particularly with reference to FIGURES 1, 2, 3 and 5, there is shown therein an animal retaining chute which is suspended on a pair of A-frames 10, each A-frame having a suitable base 11 and carrying conventional journaling 12 at the apex thereof for mounting stub axles 15 at either side. The inner ends of the stub axles 15 are welded or otherwise secured to longitudinal channel members 14 for rotation therewith. The longitudinal channel members 14 are the support for the suspension of the animal chute. Since they bear the entire weight of the suspended chute and the animal when in use, they should be of correspondingly substantial proportions. It is advantageous to have the A-frames 10 and their respective bases 11 mounted on a platform 19. This not only provides a uniform mounting support but also provides a firm area for those working with the animals.

Figure 5:
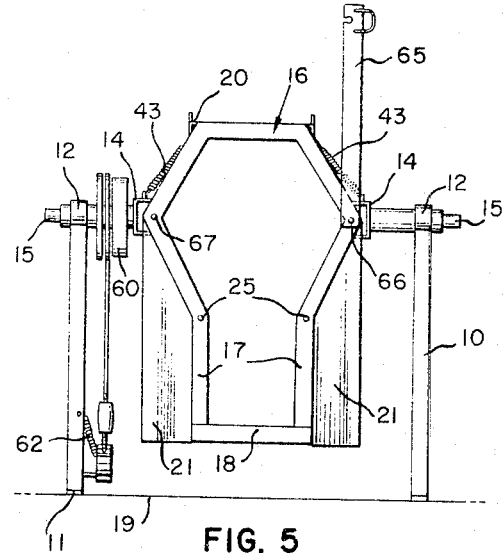
FIGURE 5 is a rear end diagrammatical elevational view showing the chute in an open position.

The animal chute itself comprises two substantially identical frames 16, one at the head end and one at the tail end. The top portions of the frames 16 are substantially hexagonal in shape with the horizontal bottom portion omitted. The lower portion of the hexagonal frame is extended in downwardly directed parallel portions 17 to form a channel of the width of the open section of the hexagon. The frames 16 are securely mounted at each end of the horizontal channel members 14. At the bottom of the chute the open ends of the parallel depending members 17 are welded or otherwise secured to a rectangular frame 18. At the top the ends are connected with a rectangular iron frame 20. As shown in FIGURE 5, the rear frame member 16 has planar blinding wing members 21 welded to it at either side which extend outwardly from the frame and vertically downward from substantially the center line of the hexagonal figure. The rectangular frame 18 is closed along the bottom thereof with a hinged floor 22 with the hinges 23 being mounted on the outside of the longitudinal face of the frame 18. Extending longitudinally between the depending vertical frame 17 are parallel side boards 24 so that a trough is formed between the two vertical side boards 24 and the floor 22 running the length of the chute. Pivotally mounted inwardly on each end frame 16 at 25 are a pair of angular arms 26. The angular arms 26 are substantially the same as the included angle of the hexagon 16. Between the arms 26 at each side are panels 27 and 28 preferably of wood so that an end view such as FIGURE 5, with the angle members 26 in their normal location, provide the chute with a keyhole appearance which is an enclosed keyhole shaped tunnel open at the top. The angular members 26 with their connecting wooden panels 27 and 28 provide the squeeze means for the animal, as will be hereinafter disclosed. It is to be observed that the members 22, 24, 27 and 28 are not required to be made of wood but may be made of any suitable material.

The angularity of the arms 26 need not conform to the precise angularity shown in the drawings. Any configuration may be used which will hold and restrain the animal's bodily movement. The more nearly the configuration fits the contours of the animal's sides and back the more complete the restraining action.

Figure 4:
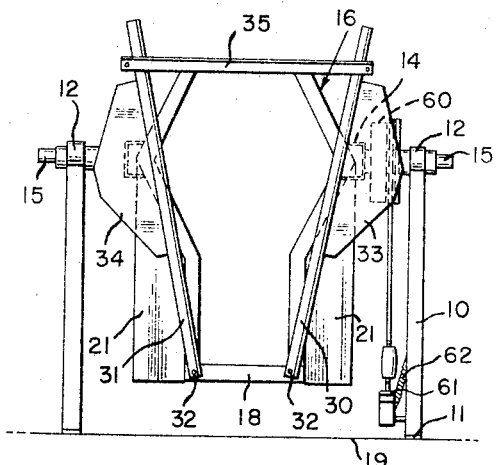
FIGURE 4 is a front end elevation showing the chute and stanchion in the open position.

At the front end of the chute there is a movable stanchion of the self-locking type which consists of two vertical neck braces 30 and 31 which are hinged at the bottom thereof at 32 to the front of the bottom frame 18. When the neck braces 30 and 31 are in open position the entire width of the keyhole shaped chamber is available as shown in FIGURE 4. The neck braces carry wing shaped portions 33 and 34 on their outer marginal edges so that when the neck braces are moved toward each other to the closed position, the wing members cover the correspondingly shaped portions of the hexagonal tunnel as shown in FIGURE 1. At the top of the hexagonal front frame 16 and in spaced relation thereto are an outer guide bar 35 and an inner guide bar 36. The space 38 between these guide bars provides a slot in which the neck braces 30 and 31 move in a transverse plane. As shown in the drawings, the neck braces extend a suitable distance above the guide bars 35 and 36 so that the operator may adjust them manually and separately if desired.

In considering the locking device for the stanchion there is shown a twin slotted plate 37 which is spring mounted on the top of the guide bar 36 so as to overlap the space 38 between the two guide members 35 and 36. The plate 37 moves longitudinally forward and backward in a horizontal plane along guides 40 and the plate 37 is spring loaded so as to be constantly urged to the forward position shown in FIGURE 2. The front face of the plate 37 is inclined rearwardly along its leading edge as shown at 41 to act as a cam surface leading up to the twin notches 42. It will thus be observed that as the neck braces 30 and 31 are moved toward the center in the guide space 38, they engage the cam surface 31 which moves the plate 37 rearwardly until the braces become engaged in the notches 42 at which time the plate moves forward to lock them in frictional engagement against the forward transverse guide bar 35. This provides a positive holding of the neck braces 30 and 31 in the locked position. To release or unlock the neck braces, the plate 37 is manually moved rearwardly and the neck braces may then be moved out of engagement with the notches.

Figure 8:
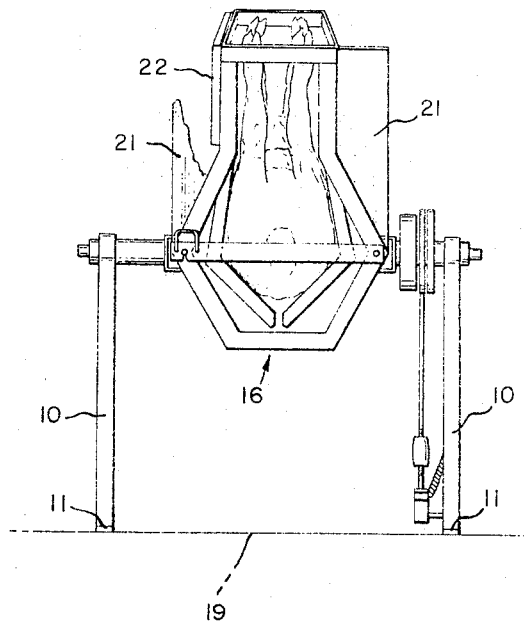
FIGURE 8 is a front end elevational view with the chute held in the inverted position with a sheep therein, by the brake mechanism showing the rear end of the chute.

The inner or squeeze portion of the chute which comprises the angle and members 26 and their connecting longitudinal wooden panel members 27 and 28 are perhaps best exhibited in FIGURES 6 and 8. These members are held in their outer position or non-engaging position shown in FIGURE 5, by means of springs 43 which are secured adjacent the median portion at the top of the wooden panel 28 at one end and at the other longitudinal side channel members 14. These squeeze sections may be manually adjusted inwardly or outwardly by the action of a single lever 45. Exactly at the middle of the top frame 20 is a transverse brace member 44. On this a T-shaped lever 45 is pivotally mounted by pivot 46 which is exactly at the juncture of the center line of the leg and cross-bar of the T. At each corner of the top frame 20 are secured pulleys 47 through which are strung suitable lengths of cord 48. The cord 48 at one end is secured to the wooden panel 28 at 50, passes through one pulley 47 and is secured in the open position of the squeeze portion to the nearest end of the T of the lever 45, thence back and through the pulley in the corner of frame 20 at the opposite corner of the same end and is secured at its other end to the wooden panel 28 on the opposite side. The precise arrangement is set up at the opposite end also. There is another transverse brace member 52 across the top of the frame which has a circular arc 53 which corresponds with the arc of travel which the lever 45 makes in rotating around the pivot 46. As shown in FIGURE 2, as the lever 45 is turned and guides on the arc of brace 53, the lengths of the triangular-like form of the cord or rope 48 will change so as to draw the two panels toward each other and cause the squeeze members to move inwardly against the bias of spring 43. The lever 45 may be suitably locked in any position along the guide arc 53 by means of notches 49 or any other conventional means.

As indicated earlier, the squeeze chute of the present invention is suspended above the ground level and preferably the level of floor 19 by means of A-frames 10 and the axles 15. Each axle is journaled at one end on an A-frame to permit rotation of the entire chute in a 360° arc at the will of the operator. In order to stop and hold the chute, at any desired degree of rotation, a brake drum 60 is provided with a suitable actuating pedal 61 for foot operation of the same. The operating pedal 61 works against the spring tension of spring 62 to keep the brake in the neutral or non-operative position at all times when not set. Suitable conventional means are used to retain brake pressure on the brake drum 60 at any position to which the chute may be rotated. The brake remains set so long as the lever or foot pedal 61 is depressed and locked in position, but when the same is disengaged the spring 62 brings it back to non-operative position.

As will be seen by reference to FIGURE 5, there is a horizontal cross-bar 65 which is pivotally mounted at the rear frame on the pivot 66 for providing a transverse brace across the rear end of the opening of the hexagon. This may be locked in position on pin 67 or in any suitable manner.

*Operation*

The operation of the device for use on sheep may be described as follows: The machine being portable is transported to a suitable location for the operations. The chute is rotated from the horizontal position shown in FIGURE 3 to about 15° or more so that the rear end of the floor 22 approaches the ground. The locking bar 65 at the rear end is disengaged so as not to block the entrance. The neck braces 30 and 31 are in the open position shown in FIGURE 4. A loading chute or other means may be used to induce entrance. Normally, the sheep's view will be blocked by wing members 21 at the rear and thus he can see daylight only through the central chute and stanchion. The sheep accordingly puts his head down, which is his normal way of proceeding, enters the chute, and thrusts his head between braces 30 and 31 at the base of the stanchion. When the sheep comes to a standstill, the neck braces are moved inwardly and as the sheep raises his head into the narrower upper portion of the stanchion, his neck is mildly pinioned.

It will be observed that because of the shaping of the end frames and the angular members 26 with their side panels 27 and 28, even in the open position the space is small enough in width so that the animal once it is positioned within the chute, cannot turn around in the chute. The lower parallel portion immediately above the floor 22 is, of course, narrower in width than the upper portion and this is so that the animal must remain upright and cannot easily lie down in the chute. When the animal is in this position standing on the floor 22 with his head through the locked stanchion at the front end and the bar 65 closing the chute at the rear end has closed any rearward egress, the T-shaped lever 45 at the top is moved so as to actuate the angular members and their connecting side panels 27 and 28 to contact the animal along the body portion therebetween. Because of the shaping of these members and the pivotal action thereof on pivots 25 as they are brought together they restrict the transverse area of the chute to produce a gentle squeeze and securely hold the animal therebetween. It will be observed that in wedging the animal in this position, there is no pressure on the animal's ribs or other bone structure so that the holding is firm without any damage to the animal and without any hurt to the animal, and the support is firm but gentle completely around to the animal's spine. It is to be observed that the squeezing operation also accommodates itself to any size animal within the limits of the device, and is therefore not dependent upon a separate or other adjustment for different sized animals within this range. When the animal is properly positioned in the chute and restrained by squeeze members, the animal is immobilized without any strain or fright. The squeeze lever 45 is then locked in the appropriate position on the arc 53.

The animal chute comprises specially shaped end frames 16 having head stanchion neck bars 30 and 31 at the front end and hinged bottom 22. A pair of longitudinal inner side squeezing means (26, 27 and 28) are cooperatively pivotally joined to the end frames 16 whereby the confining and retaining actions may be secured against the animal as it stands within the device to adjust the same to the size and shape of the animal. Cinching means 45, 53 for holding and locking the squeezing means is positioned along the top of the frame 20, and a brake means 60–61 for holding the stub shafts 15 at any degree of rotation is also provided.

It is to be noted that the pivot 25 for the squeeze members is adjacent the lower portion of the animal's body so that in pivoting it will fit the natural contours without any pinching or scraping and will support the animal's body for its longitudinal length regardless of the animal's position longitudinally in the chute.

Figure 7:
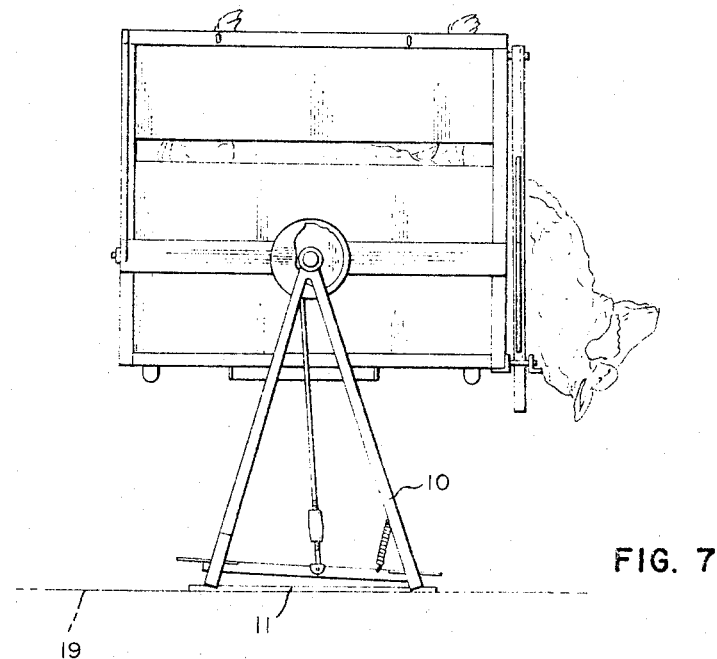
FIGURE 7 is a side elevational view showing the chute held in the inverted position with a sheep therein by the mechanical brake mechanism.

Once within the chute and securely held in position, the whole chute may be rotated so that the animal is inverted in the position shown in FIGURES 7 and 8. The upper teeth, throat, eyes and ears may be examined and treated or tagged in this position and work on the hoofs is made completely practical. To work on the animal's feet in this inverted position all that is necessary is to open the floor 22, rotate it on its hinges 23 and place it in the position shown in FIGURE 8 where it is out of the way. The animal is immobilized and securely held without any pressure so that it is possible to do hoof clipping and treat the heart of the hoof of the animal without any danger, and all with perfect humaneness. Of course, when it is necessary to work on the animal's hind quarters, the bar 65 is swung out of engagement to make this area accessible for such operations, whether in the standing or inverted positions. In order to ventilate and keep the trough comfortable at all times when the animal is in it, air spaces are provided between panels 24, 27 and 28.

Whenever the operation on an individual animal is completed, the chute is rotated downwardly in front and the neck restraining bars 30 and 31 are moved outwardly and out of engagement with the holding notches 42 so that the front end is open to the position shown in FIGURE 4 and the animal immediately walks out of the front end of the chute feeling no worse for wear, and in better physical condition than he went in.

When the chute has been pivoted to this or another position, brake lever 61 is depressed, thereby braking the axle 15 to a set position. The animal may now be examined and treated. In order to release the position, the brake lever 61 is first released and the chute 14 returned to the animal's position or any other desired position.

We claim:
1. An animal squeeze chute in combination, an animal receiving assembly for holding an animal in the standing position open at both the front and rear ends and having upper and lower portions and a hinged bottom, said upper portion shaped with the opposed sides angled longitudinally outwardly, said lower portion having closely spaced vertical sides to permit an animal to stand only, holding means within said upper portion angled longitudinally outward to comfortably surround an animal's body and give full support without squeezing the animal's ribs, said holding means being pivotally mounted at each end for opposed movement within said upper portion, lever means for adjustably regulating and maintaining the said holding means to confine an animal, transversely aligned support means for rotatably supporting said animal receiving assembly above the ground for 360° rotation in a longitudinal vertical plane, and means for holding said assembly in any position of rotation.

2. The squeeze chute of claim 1 wherein there is a stanchion at the forward end of said animal receiving assembly for gently locking the neck of the animal therebetween so that its head protrudes and a tail gate across the rear end for holding the animal in the assembly.

3. The squeeze chute of claim 2 having transverse blinder wings secured to the rear end thereof and extending outwardly therefrom.

4. An animal squeeze chute in combination, an animal receiving assembly for holding an animal therein in the standing position open at the top and at the front and rear ends and having an upper and lower portion and a longitudinal hinged bottom, said upper portion being shaped and having its longitudinal opposed sides closed, said lower portion being narrower in cross-section with its sides spaced to provide only comfortable standing room for an animal, holding means for an animal's body within said upper portion having opposed longitudinal sides each angled longitudinally outward and each pivotally mounted for opposed movement at each end adjacent the lower edge thereof, cinch bar means for synchronously moving said holding means to comfortably surround and secure an animal's body therebetween with full support and to lock the same in the holding position, aligned stub axles mounted transversely on either side of said animal receiving means, support means having journals for receiving said stub axles and provide 360° rotation in a longitudinal vertical plane for said animal receiving assembly, and brake means for holding the assembly in the appropriate rotated position.

5. The squeeze chute of claim 4 having a movable head stanchion at the front end pivotally mounted to permit an animal's head to pass therethrough when open and to close around the animal's neck to maintain said position with the animal's head protruding beyond said chute when closed, and a movable tail lock at the rear end to wholly retain an animal's hind quarters in the assembly.

6. The squeeze chute of claim 4 having transverse blinder wings attached to the rear end of said assembly and extending outwardly therefrom.

7. A portable animal squeeze chute for humanely immobilizing an animal and rotating it in the immobilized position in combination, an animal receiving assembly for holding an animal therein in the standing position open at the top and at the front and rear ends and having an upper and lower portion and a longitudinal hinged bottom, said upper portion being shaped and having its longitudinal opposed sides closed, said lower portion being narrower in cross-section with its sides closely spaced to provide only comfortable standing room for an animal and having a depth less than the length of the animal's legs, holding means for an animal's body within said upper portion having opposed longitudinal sides each angled longitudinally outward and each pivotally mounted for opposed movement at each end adjacent the lower edge thereof, cinch bar means for synchronously moving said holding means in opposed directions to comfortably surround and secure an animal's body therebetween with full support and to lock the same in the holding position, a head stanchion at the front end pivotally mounted in two transverse sections to permit an animal's head to pass therethrough when in the open position and permit only the animal's head to project from said chute in the closed position, a movable tail bar at the rear end to wholly retain an animal's hind quarters within the assembly, transversely aligned stub axles mounted on either side of said animal receiving means, support means having journals for receiving said stub axles and provide 360° rotation in a longitudinal vertical plane for said animal receiving assembly, and brake means for holding the assembly in the appropriate rotated position.

References Cited by the Examiner

UNITED STATES PATENTS 1,487,977 3/1924 Ryan _____ 119—103
2,713,326 7/1955 Stephenson _____ 119—99

FOREIGN PATENTS 129,203 9/1948 Australia.

SAMUEL KOREN, *Primary Examiner.*

HUGH R. CHAMBLEE, *Examiner.*